(12) United States Patent
Gustave et al.

(10) Patent No.: US 8,266,671 B2
(45) Date of Patent: Sep. 11, 2012

(54) POLICY-ENABLED AGGREGATION OF IM USER COMMUNITIES

(75) Inventors: Christophe Gustave, Ottawa (CA); Brad McFarlane, Ottawa (CA); Stanley TaiHai Chow, Ottawa (CA)

(73) Assignee: Alcatel Lucent, Paris (FR)

( * ) Notice: Subject to any disclaimer, the term of this patent is extended or adjusted under 35 U.S.C. 154(b) by 1196 days.

(21) Appl. No.: 11/882,514

(22) Filed: Aug. 2, 2007

(65) Prior Publication Data

US 2009/0037973 A1    Feb. 5, 2009

(51) Int. Cl.
 *G06F 21/00* (2006.01)
(52) U.S. Cl. ............................................. 726/1; 715/758
(58) Field of Classification Search ...... 726/1; 715/751, 715/752, 758, 700
See application file for complete search history.

(56) References Cited

U.S. PATENT DOCUMENTS

| 6,345,297 | B1 |  | 2/2002 | Grimm et al. |
| 6,421,694 | B1 | * | 7/2002 | Nawaz et al. ................. 715/234 |
| 6,671,695 | B2 | * | 12/2003 | McFadden .................... 707/656 |
| 6,941,345 | B1 | * | 9/2005 | Kapil et al. ................... 709/206 |
| 7,565,683 | B1 | * | 7/2009 | Huang et al. ....................... 726/1 |
| 7,802,174 | B2 | * | 9/2010 | Teng et al. ..................... 715/200 |
| 7,953,846 | B1 | * | 5/2011 | Amoroso et al. .............. 709/224 |
| 2002/0184310 | A1 |  | 12/2002 | Traversat et al. |
| 2004/0215737 | A1 |  | 10/2004 | Della Pasqua |
| 2005/0086211 | A1 |  | 4/2005 | Mayer |
| 2005/0086300 | A1 |  | 4/2005 | Yeager et al. |
| 2005/0125277 | A1 | * | 6/2005 | Estrada et al. ...................... 705/9 |
| 2005/0262542 | A1 | * | 11/2005 | DeWeese et al. .............. 725/106 |
| 2006/0218000 | A1 | * | 9/2006 | Smith et al. ........................ 705/1 |
| 2006/0294598 | A1 | * | 12/2006 | Lam et al. ......................... 726/28 |
| 2007/0294237 | A1 | * | 12/2007 | John et al. .......................... 707/4 |
| 2008/0033776 | A1 | * | 2/2008 | Marchese ........................... 705/8 |
| 2009/0018850 | A1 | * | 1/2009 | Abhyanker ........................ 705/1 |

* cited by examiner

*Primary Examiner* — Hadi Armouche
(74) *Attorney, Agent, or Firm* — Kramer & Amado P.C.

(57) ABSTRACT

A method of automatically aggregating an online user community, and graphical user interface for same, the method including one or more of the following: a user creating the online community; the user defining an aggregation policy for the online user community; a service provider retrieving the aggregation policy; the service provider applying the aggregation policy to an other user; determining whether the other user fits the aggregation policy; adding the other user to the online user community; the user defining an anti-aggregation policy; the service provider retrieving the anti-aggregation policy; determining whether the other user fits the anti-aggregation policy; and removing the other user from the online user community when the other user fits the anti-aggregation policy.

15 Claims, 3 Drawing Sheets

POLICY-ENABLED AGGREGATION OF IM USER COMMUNITIES

BACKGROUND OF THE INVENTION

1. Field of the Invention

This invention relates generally to policy enabled aggregation of user communities.

2. Description of Related Art

Communication service providers enable communication between pluralities of users in many different ways. An example of communications enabled between the plurality of users by a service provider is instant messaging (IM).

Often, the users of communication services desire to be aggregated into communities. The desire of users to be aggregated in communities exists for many reasons. Thus, there is a need for a social networking service with a robust approach to the formation of user communities.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations and improvements herein shown and described in various exemplary embodiments.

SUMMARY OF THE INVENTION

In light of the present need for policy enabled aggregation of user communities, a brief summary of various exemplary embodiments is presented. Some simplifications and omission may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

Various exemplary embodiments are a method of automatically aggregating an online user community, including one or more of the following: a user creating the online community; the user defining an aggregation policy for the online user community; a service provider retrieving the aggregation policy; the service provider applying the aggregation policy to an other user; determining whether the other user fits the aggregation policy; adding the other user to the online user community; the user defining an anti-aggregation policy; the service provider retrieving the anti-aggregation policy; determining whether the other user fits the anti-aggregation policy; and removing the other user from the online user community when the other user fits the anti-aggregation policy.

Various exemplary embodiments include one or more of the following: the user triggering aggregation for the online user community; the service provider sending an add request to the other user; the other user accepting the add request; determining that an additional other user exists and repeating the service provider applying the aggregation policy to the additional other user; defining the aggregation policy includes defining a criteria selected from the list consisting of one or more interests of the user, a physical location of the user, a gender of the user, and an age of the user; the user creating a plurality of online communities, wherein the user has a unified view of all of the plurality of online communities; the user creating a plurality of online communities, and the service provider providing the user and automated view of the plurality of online communities; a membership of the online community is determined transparently from a peer perspective; private information about the user is not available to the other user and private information about the other user is not available to the user; communicating through a communication network, such as, for example, the Internet, including, for example, an instant messaging network; an identity of the user and an identity of the other user correspond to an e-mail address of the user and an e-mail address of the other user; and determining whether a pre-determined maximum capacity of the online community has been reached.

Various exemplary embodiments are a graphical user interface for an online user community, including a list of a user's online user communities, wherein each of the user's online user communities lists other users that are members of each of the user's online user communities, and a list of an other user's other communities consisting of the user's online user communities.

In various exemplary embodiments, a service provider initiates a delete request to users in the other communities whose aggregation policy no longer matches a profile of the user when the user modifies the profile.

In various exemplary embodiments, a service provider initiates an add request to communities having an aggregation policy that matches a profile of the user when the user modifies the profile.

In various exemplary embodiments, a service provider initiates a delete request to users in the list of the user's online communities when a profile of the user is deleted.

In various exemplary embodiments, a service provider initiates a delete request to users in the other communities when a profile of the user is deleted.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
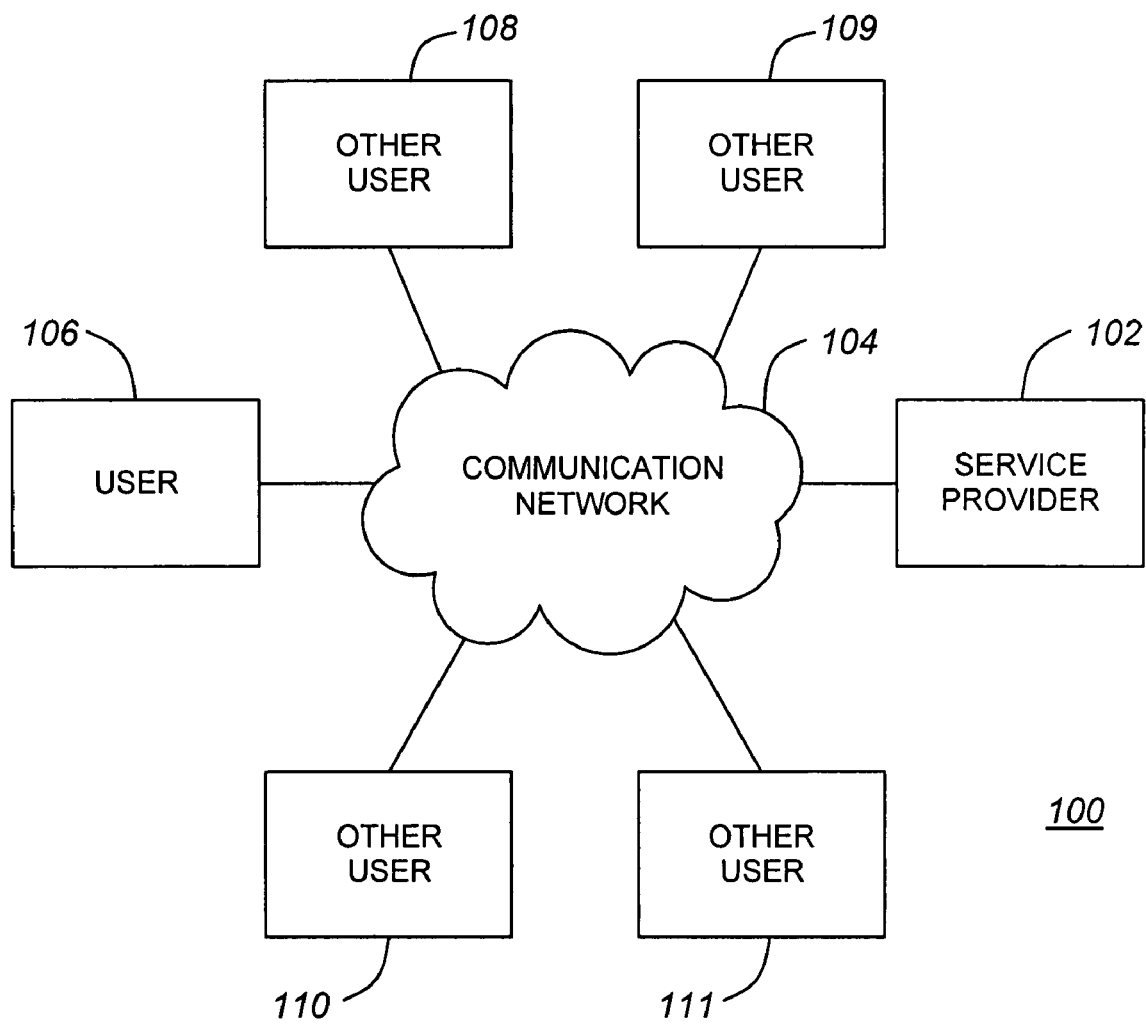
FIG. 1 is a schematic diagram of an exemplary system for policy enabled aggregation of user communities.

On a networking website, a user may expand a social network by adding to his "buddies list" other subscribed users with whom the particular user has one or more common interests. When a user successfully adds another user into his buddies list, his social network expands to the buddies list of the added user. In a reciprocal fashion, the buddies list of the added user also expands to include buddies on the list of the initial user.

However, in order to have access to communities, such as the communities described above, specific to a web service, a user often must create an account. Likewise, each time a user wants to have access, often the user must login via a web browser to an established account. Often, this requires abiding by the specifics of applicable web portal rules.

Further, in various exemplary embodiments, a user manually searches based on the users own criteria, and manually adds new users to his buddies list matching the user's interest.

According to the embodiments described above, subscribing and subsequentially accessing a plethora of social networks is cumbersome for a user. This is particularly true if the user desires to have access on a regularly basis to the plurality of communities. A problem with such embodiments is that the compartmentalization into various web portals fails to permit a user to have a unified view of all of his communities.

Some instant messaging tools provide a means to build contact lists by selecting a user that is already known from the user's address book or by answering directly a user's IM handle through the IM graphical user interface (GUI). Unfortunately, in such embodiments, it is not possible for users to have an automated access to other users based on shared common interests or more generally based upon a specific user-defined user attribute.

In other embodiments directed to provide an automated means for users to be matched with one another for a general network application, the existing base of user profiles and the ubiquity of client applications are not taken advantage of to provide an automated and unified view of user-defined communities.

Other embodiments are related to providing a trust mechanism for peer-to-peer entities. Thus, in various exemplary embodiments, trust is determined based on a peers group interest. In this manner, social interaction of a network of peers is tied to trust. In other words, various exemplary embodiments pertain to determining peer interest for building community of users into IM application space, for building a network of trust, or both.

Various exemplary embodiments pertain to a method, in a peer-to-peer environment, to associate peer entities with groups, providing peer group creation binding and discovery capabilities. Such embodiments include a process to determine whether a peer entity is qualified to be a member of a peer group. However, it is believed to be advantageous for groups to be owned by peer entities and for membership to be determined automatically and transparently from a peer perspective. Thus, various exemplary embodiments incorporate this capability.

Various exemplary embodiments make use of a social website where a user browses among a set of users based on specific attributes. Some embodiments subsequentially enable a seamless integration of matched users into the buddies list of the user making a search. Unfortunately, such embodiments fail to overcome a requirement that a user manually search and an additional and unrelated requirement that limit the list of users from which to select to the users known to a specific social networking website. Thus, there is a need for embodiments that overcome these disadvantages.

Various exemplary embodiments enable an IM user to determine an affinity level associated with another user part of users already known from his contact list. However, such embodiments fail to permit an automatic federation of otherwise unknown IM users into a particular user's contact list on a per-interest or aggregation policy basis for the given user. Thus, various exemplary embodiments provide the foregoing advantages.

In view of the foregoing, a need exist for online users to share access to communities of users in a unified and automated manner. Likewise, a need exist for a simple and consistent interface that enables users to build their own user communities of interest without giving away a level of privacy required for the user. Accordingly, various exemplary embodiments enable a unified and automated access and management of online communities of users through IM systems.

Referring now to the drawings, in which like numerals refer to like components or steps, there are disclosed broad aspects of various exemplary embodiments.

FIG. 1 is a schematic diagram of an exemplary system 100 for policy enabled aggregation of user communities. The system 100 includes the service provider 102, a communications network 104, a user 106 and other users 108, 109, 110, 111.

In various exemplary embodiments, the service provider 102 is an IM service provider that enables IM communications between the user 106 and the other users 108, 109, 110, 111 through the communications network 104. Various exemplary embodiments provide a means for automatically selecting a set of IM users and aggregating the set of IM users into a community of users that share one or more common characteristics. In various exemplary embodiments, the shared common characteristics are defined by a policy that can be customized such as an aggregation policy specified by the user 106. This will be discussed in greater detail below.

Various exemplary embodiments are intended to satisfy a need of the users 106, 108, 109, 110, 111 to more easily share and access online communities of users. The popularity of social networking sites indicates that a growing number of users 106, 108, 109, 110, 111 desire to access diversified groups or communities of online users 106, 108, 109, 110, 111. Thus, in various exemplary embodiments, the communication network 104 is the Internet.

Accordingly, various exemplary embodiments leverage an established based of IM infrastructures to enable a unified way for a user to build, and subsequentially seamlessly access, one or more online communities of users. Various exemplary embodiments may be implemented in connection with any existing, or later known, IM or other service provider 102.

In various exemplary embodiments, the subject matter described herein is implemented in a unified IM service gateway. Accordingly, in various exemplary embodiments, the subject matter described herein is available to any IM subscriber federated by a unified IM service gateway.

In various exemplary embodiments, communities of users 106, 108, 109, 110, 111 are built and automatically updated based on specific characteristics defined by each user. In various exemplary embodiments, the privacy associated with a user is administered according to a user-defined policy. Thus, in various exemplary embodiments, a user's access is restricted to only users matching specific characteristics defined by the user.

In various exemplary embodiments, a profile is associated with each user 106, 108, 109, 110, 111. In various exemplary embodiments, the profile associated with each user records information such as the user's interests, physical location and demographic information such as gender, age and so on.

In various exemplary embodiments, when a user desires to create a new community of users, the user specifies an aggregation policy that defines one or more characteristics of other users to be added to the group of users being created. Examples of characteristics used to define an aggregation policy include, but are not limited to, physical location of the user, interests of the user, basic profile information of the user, and so on. Similarly, in various exemplary embodiments, an aggregation policy is defined using one or more sets of characteristics previously defined by the user, or one or more sets of characteristics provided to the user 106 by the service provider 102.

In various exemplary embodiments, policy checking is performed through a regular expression pattern matching that is applied to corresponding fields into a respective user profile. Thus, in various exemplary embodiments, a threshold value specifies a maximum number of users to be added to a community. Such embodiments define a limit on the number of users that can be aggregated in a community. In other exemplary embodiments profiles are evaluated in different ways. Accordingly, various exemplary embodiments assign "point" values for one or more criteria and matching/inclusion is based on cumulative point counts and thresholds and/or ranges.

In various exemplary embodiments, the subject matter described herein is implemented by the service provider 102 as a global policy mechanism restricting a number of aggregated entities for a given group. Thus, various exemplary embodiments prevent an excessive workload for a server of the service provider 102. This prevents the service provider 102 from being required to handle more attempts by users 106, 108, 109, 110, 111 to create or add to a community at a particular time. In various exemplary embodiments, a policy allows the user 106 to specify whether the user 106 needs to explicitly approve each request by one or more of the other users 108, 109, 110, 111 to add the user 106 to one or more communities of the other users 108, 109, 110, 111.

In various exemplary embodiments, the user 106 has the option to disable subject matter described herein according to other exemplary embodiments. Thus, in various exemplary embodiments, the user 106 is able to preserve his privacy fully and completely such that the user 106 is not impacted by mechanisms enabling aggregation of communities of users according to other exemplary embodiments described herein.

Still further, various exemplary embodiments enable the user 106 to define specific anti-aggregation policies that enable the user 106 to specify which other users 108, 109, 110, 111 are permitted, or are not permitted, to aggregate the user 106 into their respective community groups. Likewise, various exemplary embodiments enable the user 106 to specify whether the user 106 needs to explicitly approve add requests in order to be added into a community of one or more of the other users 108, 109, 110, 111.

In various exemplary embodiments, an anti-aggregation policy of the user 106 is specified in the same manner as the user 106 specifies an aggregation policy. In various exemplary embodiments, policy checking is performed by way of a pattern matching expression that is applied to one or more specific fields associated with a profile of the user 106 when the user 106 initiates a request to add an aggregation of other users 108, 109, 110, 111.

The following is an example of a policy aggregation associated with a user-defined community according to one exemplary embodiment. The user 106 specifies an aggregation of other users 108, 109, 110, 111 that are located in Ottawa or Paris, are interested in soccer, and work for Alcatel. Such an aggregation request gathers other users 108, 109, 110, 111 who share an employer in common with the user 106, an interest in common with the user 106, and one of two geographical locations.

Figure 2:
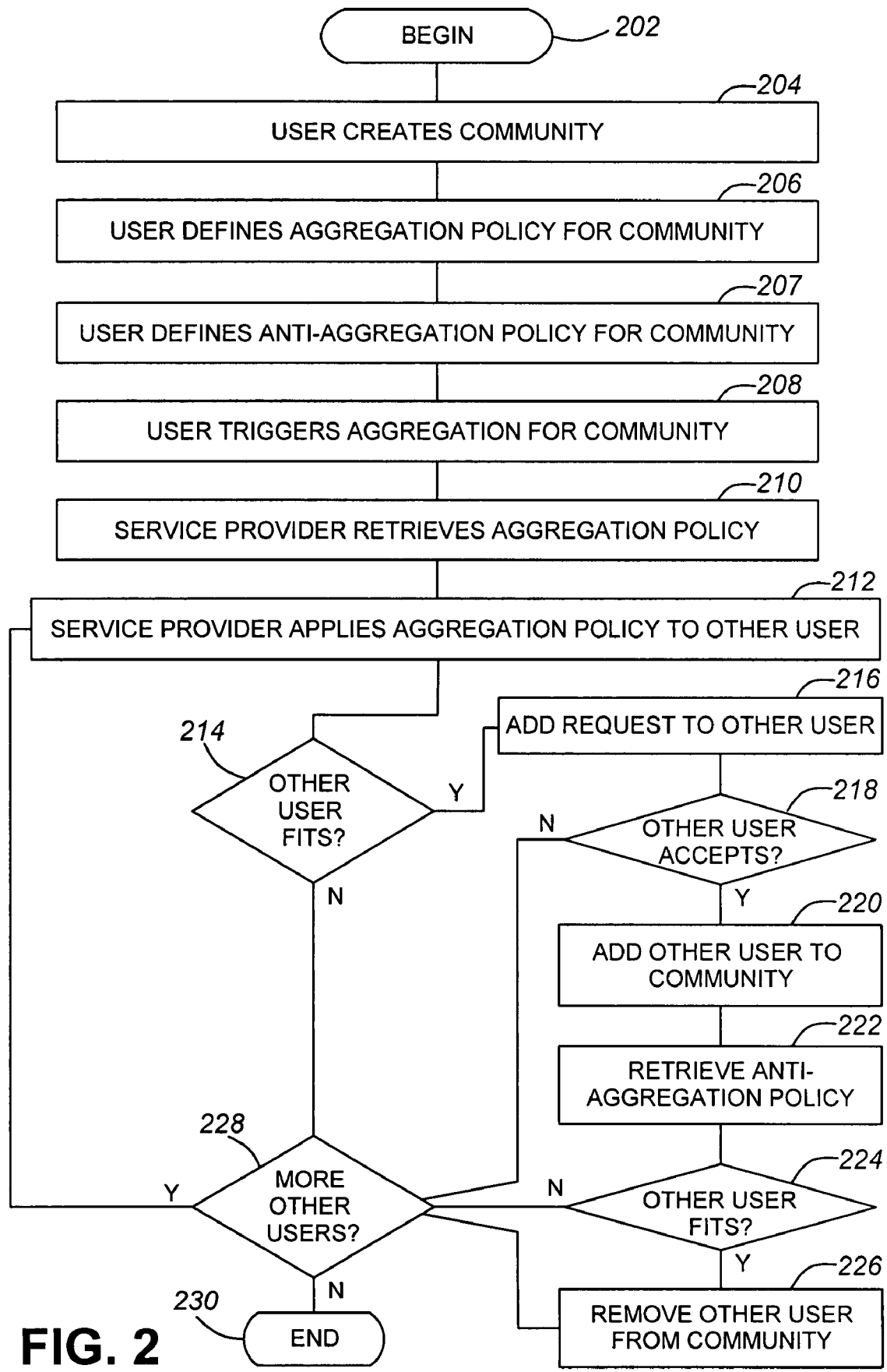
FIG. 2 is a flowchart of an exemplary embodiment of a method for policy enabled aggregation of user communities.

FIG. 2 is a flowchart of an exemplary embodiment of a method 200 for policy enabled aggregation of user communities. The method 200 begins in step 202 and then continues to step 204.

In step 204, the user 106 creates a community. Next, in step 206, the user 106 defines an aggregation policy for the community. In step 207, the user 106 defines an anti-aggregation policy. This is discussed in greater detail both above and below. Various exemplary embodiments do not include step 207.

In various exemplary embodiments, step 208 is included wherein the user 106 triggers aggregation for the community. In other exemplary embodiments, aggregation for the community is automatically triggered by the service provider 102.

In step 210, the service provider 102 retrieves the aggregation policy defined by the user 106 in step 206. Then, in step 212, the service provider 102 applies the aggregation policy to one of the other users 108, 109, 110, 111.

The method 200 then proceeds to step 214 where a determination is made whether one of the other users 108, 109, 110, 111 fits the aggregation policy applied by the service provider 102 in step 212. If a determination is made in step 214 that one of the other users 108, 109, 110, 111 does fit the aggregation policy applied by the service provider 102 in step 212, then the method 200 proceeds to step 216.

In step 216, an add request is sent to one of the other users 108, 109, 110, 111 by the service provider 102. The method 200 then proceeds to step 218 where a determination is made whether the one of the other users 108, 109, 110, 111 accepts the add request sent in step 216.

When a determination is made in step 218 that the one of the other users 108, 109, 110, 111 accepts the add request, then the method 200 proceeds to step 220 where the one of the other users 108, 109, 110, 111 is added to the community created by the user 106 in step 204. In various exemplary embodiments, the other users 108, 109, 110, 111 define that they will accept all add requests automatically.

Similarly, in various exemplary embodiments, the service provider 102 structures the method 200 such that the other users 108, 109, 110, 111 are automatically added to the community in step 220 after a determination is made in step 214 that the other user fits the aggregation policy defined by the user 106 in step 206. In other words, various exemplary embodiments omit both step 216 and step 218.

Following step 220, the method 200 proceeds to step 222. In step 222, an anti-aggregation policy of the user 106, if any, is retrieved. Obviously, if the user 106 has not defined an anti-aggregation policy, then the method 200 does not include step 222.

After retrieving an anti-aggregation policy in step 222, the method 200 proceeds to step 224. In step 224, a determination is made whether the other user 108, 109, 110, 111 added to the community in step 222 fits the anti-aggregation policy of the user 106.

If a determination is made in step 224 that the other user 108, 109, 110, 111 does fit an anti-aggregation policy of the user 106, then the method 200 proceeds to step 226 where the other users 108, 109, 110, 111 is removed from the community of the user 106. The method 200 then proceeds to step 228 where a determination is made whether any additional ones of the other users 108, 109, 110, 111 exists for which steps 212 through 226 have not yet been applied.

Likewise, if a determination is made in step 224 that the other user 108, 109, 110, 111 does not fit an anti-aggregation policy defined by the user 106, then the method 200 proceeds to step 228. Similarly, if a determination is made in step 218 that the other user 108, 109, 110, 111 does not accept an add request, then the method 200 proceeds to step 228. Also, when a determination is made in step 214 that the other user 108, 109, 110, 111 does not fit the aggregation policy applied by the service provider 102 in step 212, then the method 200 proceeds to step 228.

If a determination is made in step 228 that additional ones of the other users 108, 109, 110, 111 exist for which steps 212 through 226 have not been performed, then the method 200 returns to step 212. Alternatively, when a determination is made in step 228 that all other users 108, 109, 110, 111 have been evaluated by steps 212 through 226, then the method 200 proceeds to step 230 where the method 200 ends.

According to the foregoing, various exemplary embodiments eliminate a requirement that the user 106 manually create a community of users, such as by subscribing to one or more networking websites, selecting users from a user base of a networking website, and adding the selected users to the new community.

The subject matter described above in connection with FIG. 2 is associated with the aggregation of a community of users from the perspective of the service provider 102. In various exemplary embodiments, the service provider 102 notifies the user 106 of a progression of the creation of a specific community of users requested by the user 106. Accordingly, various exemplary embodiments indicate a current number of users that have not yet replied to add requests sent in step 216.

In various exemplary embodiments, the service provider 102 maintains a record of associations between the user 106 and communities defined by the user 106. Thus, in various exemplary embodiments, when processing add requests between two users already known to each other, the service provider 102 silently adds the users into the new community without including steps 216 or 218 in the method 200.

Figure 3:
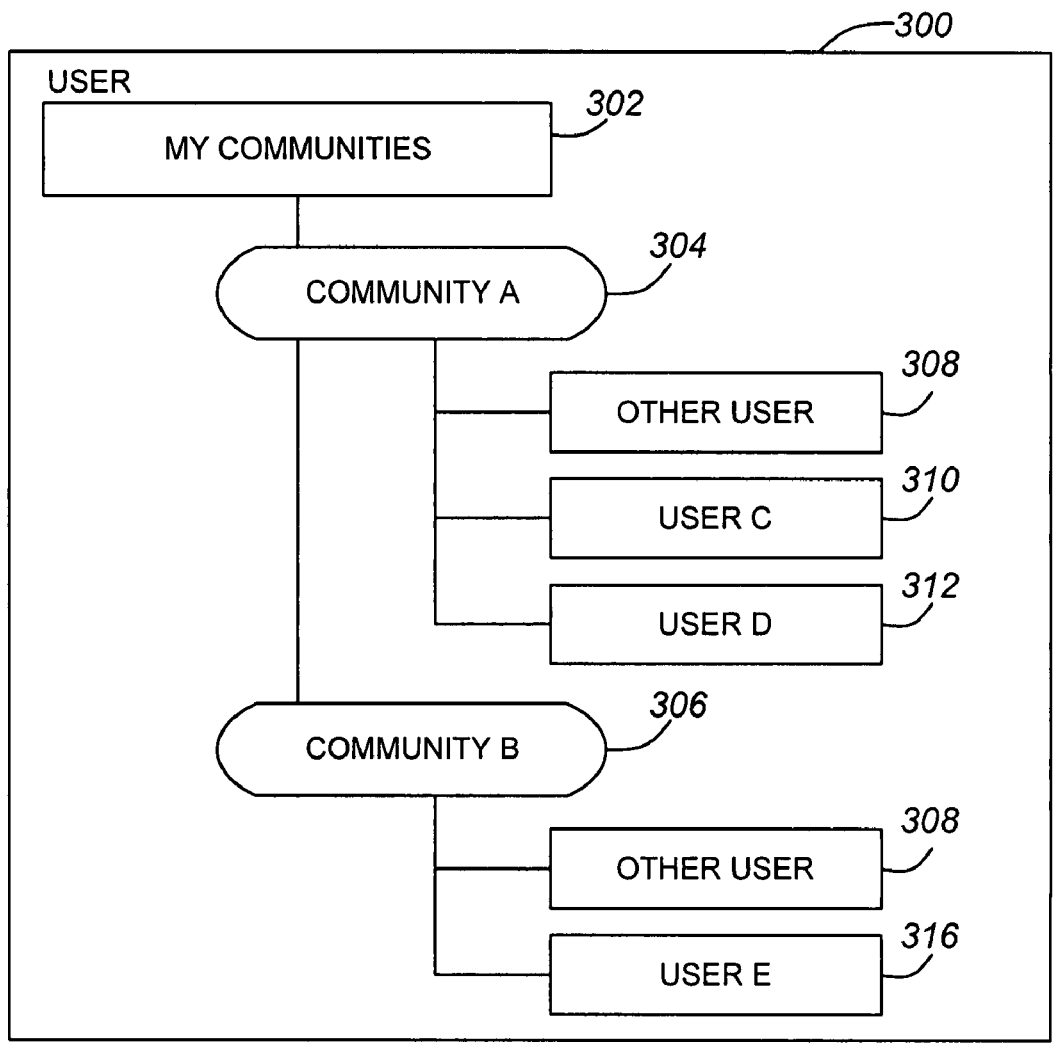
FIG. 3 is a schematic diagram of a first exemplary embodiment of a graphical user interface for policy enabled aggregation of user communities.
Figure 4:
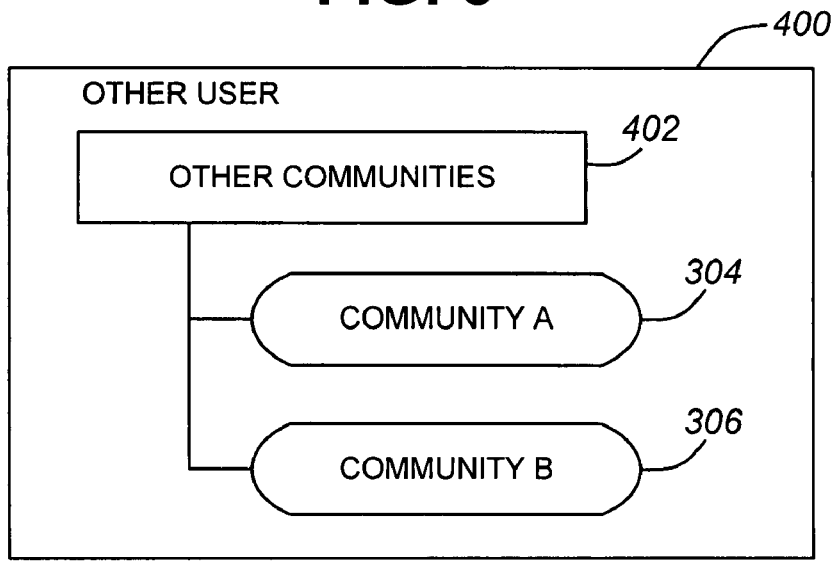
FIG. 4 is a schematic diagram of a second exemplary embodiment of a graphical user interface for policy enabled aggregation of user communities.

FIG. 3 is a schematic diagram of a first exemplary embodiment of a graphical user interface (GUI) 300 for policy enabled aggregation of user communities. FIG. 4 is a schematic diagram of a second exemplary embodiment of a graphical user interface (GUI) 400 for policy enabled aggregation of user communities.

The GUI 300 corresponds to a community list for the user 106. The GUI 400 corresponds to a community lists for one of the other users 108, 109, 110, 111. Thus, GUI 300 and GUI 400 collectively show an example of contact lists that result from an association between user 106 and one of the other users 108, 109, 110 and 111 based on an application of the method 200.

As depicted, upon successfully adding the other user 308 into Community A 304 the user 106 creates another Community B 306 associating an aggregation policy matching the profile of the other user 308. As depicted, Community A 304 also includes User C 310 and User D 312. Likewise, as depicted, Community B 306 also includes User E 316.

As depicted, the bundle named My Communities 302 is a list grouping all of the communities belonging to the user 106. Similarly, the bundle named Other Communities 402 groups all of the users owning a community of which the particular user 106 is a part of. Thus, the Other Communities 402 includes Community A 304 and Community B 306.

In various exemplary embodiments, upon a change of a subscriber base for the service provider 102, including a modification, creation or deletion of a user profile, the service provider 102 notifies users impacted by the change of potential changes in their communities. Accordingly, in various exemplary embodiments, changes to a user community are performed in a silent mode with no user intervention based on the user's settings.

Alternatively, in various exemplary embodiments, changes to a user community are performed by prompting the user if the user wants to accept the change or let the community remain untouched. Again, in various exemplary embodiments this is determined based on settings defined by the user.

There are a variety of combinations where a user creates a profile, modifies an existing profile or deletes an existing profile. Each of these three possibilities has a different impact on My Communities 302, Other Communities 402, and even external communities. External communities refer to existing communities in the system 100 that the user 106 is not associated with. Each of these possibilities will be discussed in turn.

In various exemplary embodiments, when the user 106 modifies his profile, the impact on My Communities 302 is as follows. The service provider 102 initiates a delete request to each user 308, 310, 312, 316 in My Communities 302 whose anti-aggregation policy matches the new profile of the user 106.

In various exemplary embodiments, when the user 106 modifies his profile, the impact on Other Communities 402 is as follows. The service provider 102 initiates a delete request to users in Other Communities 402 whose aggregation policy no longer matches the new profile of the user 106.

In various exemplary embodiments, when the user 106 modifies his profile, the impact on external communities is as follows. The service provider 102 initiates add request to communities whose aggregation policy now matches the new profile of the user 106.

When a new profile of a user 106 is created, the impact on My Communities 302 and Other Communities 402 is not applicable because My Communities 302 and Other Communities 402 have not yet been created for the newly created user. However, in various exemplary embodiments, when a new user profile is created, the service provider 102 initiates add requests to communities whose aggregation policy matches the new user profile.

When a user profile is deleted, the impact on external communities is not applicable. However, in various exemplary embodiments, the impact on My Communities 302 when a user profile is deleted is as follows. The service provider 102 initiates a delete request to users 308, 310, 312, 316 in My Communities 302.

In various exemplary embodiments, when a user profile is deleted, the impact on Other Communities 402 is as follows. The service provider 102 initiates a delete request to users in Other Communities 402.

In various exemplary embodiments, the user 106 is enabled to delete a community such as Community A 304 or Community B 306. Correspondingly, in various exemplary embodiments, when the user 106 deletes Community A 304 or Community B 306 the user 106 is removed from the Other Communities 402 list of users belonging to Community A 304 or Community B 306.

According to the foregoing, various exemplary embodiments overcome current limitations on IM tools. Likewise, various exemplary embodiments solve problems associated with the federation of communities of online users. Various exemplary embodiments enable providers of IM technology to seamlessly provide a policy-based social networking service.

Various exemplary embodiments enable users of social networking services to have easy and time-effective access to a wide range of user communities according to customized criteria. In addition to embodiments implemented in IM systems, other exemplary embodiments are implemented using e-mail addresses.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A method of automatically aggregating an online community, comprising:
   a service provider retrieving a defined aggregation policy defined by a first user for the online community;
   the service provider applying the retrieved aggregation policy to a second user;
   the service provider determining whether the second user fits the retrieved aggregation policy;
   the service provider automatically adding the second user to the created online community when the second user fits the retrieved aggregation policy;
   the service provider retrieving an anti-aggregation policy defined by the first user, wherein the definitions of both the aggregation policy and the anti-aggregation policy independently assemble sets of users;
   the service provider determining whether the second user fits the retrieved anti-aggregation policy; and
   the service provider automatically removing the second user from the created online community when the second user fits the retrieved anti-aggregation policy.

2. The method of claim 1, further comprising:
   the service provider triggering aggregation for the created online community.

3. The method of claim 1, further comprising:
   the service provider sending an add request to the second user.

4. The method of claim 1, further comprising:
   the service provider determining that a third user exists; and
   the service provider applying the aggregation policy to the third user.

5. The method of claim 1, further comprising:
   the service provider defining the aggregation policy by selecting criteria from a list consisting of one or more interests of the first user, a physical location of the first user, a gender of the first user, and an age of the first user.

6. The method of claim 1, further comprising:
   the service provider giving the first user an automated view of a plurality of online communities.

7. The method of claim 1, further comprising:
   the service provider determining a membership of the online community transparently from a peer perspective.

8. The method of claim 1, wherein private information about the first user is not available to the second user and private information about the second user is not available to the first user.

9. The method of claim 1, further comprising:
   communicating through a communication network.

10. The method of claim 9, wherein the communication network is the Internet.

11. The method of claim 9, wherein the communication network is an instant messaging network.

12. The method of claim 1, wherein an identity of the first user and an identity of the second user correspond to an e-mail address of the first user and an e-mail address of the second user.

13. The method of claim 1, further comprising:
   determining whether a pre-determined maximum capacity of the online community has been reached.

14. A method of automatically aggregating an online community, comprising:
   a service provider retrieving a defined aggregation policy defined by a first user for the online community;
   the service provider applying the retrieved aggregation to a second user;
   the service provider determining whether the second user fits the retrieved aggregation policy;
   the service provider automatically adding the second user to the created online community when the second user fits the retrieved aggregation policy;
   the service provider retrieving an anti-aggregation policy defined by the first user, wherein the definitions of both the aggregation policy and the anti-aggregation policy independently assemble sets of users;
   the service provider determining whether the second user fits the retrieved anti-aggregation policy;
   the service provider automatically removing the second user from the created online community when the second user fits the retrieved anti-aggregation policy; and
   the service provider initiating a delete request to each user whose anti-aggregation policy matches a newly modified profile of the first user.

15. A method of automatically aggregating an online community, comprising:
   a service provider retrieving a defined aggregation policy defined by a first user for the online community;
   the service provider applying the retrieved aggregation policy to a second user;
   the service provider determining whether the second user fits the retrieved aggregation policy;
   the service provider automatically adding the second user to the created online community when the second user fits the retrieved aggregation policy;
   the service retrieving an anti-aggregation police defined by the first user, wherein the definitions of both the aggregation policy and the anti-aggregation policy independently assemble sets of users;
   the service provider determining whether the second user fits the retrieved anti-aggregation policy;
   the service provider automatically removing the second user from the created online community when the second user fits the retrieved anti-aggregation policy; and
   the service provider initiating a delete request to each user whose aggregation policy no longer matches a newly modified profile of the first user.

* * * * *